United States Patent [19]
Fannin et al.

[11] Patent Number: 4,685,545
[45] Date of Patent: Aug. 11, 1987

[54] HYDRAULIC DAMPER FOR VEHICLES WITH VARIABLE ORIFICE PISTON VALVING FOR VARYING DAMPING FORCE

[75] Inventors: Wayne V. Fannin, Xenia; Harry C. Buchanan, Jr., Spring Valley, both of Ohio

[73] Assignee: General Motors Corporation, Detroit, Mich.

[21] Appl. No.: 892,742

[22] Filed: Jul. 31, 1986

Related U.S. Application Data

[63] Continuation of Ser. No. 685,806, Dec. 24, 1984, abandoned.

[51] Int. Cl.[4] ............................ F16F 9/46; F16F 9/48
[52] U.S. Cl. ............................ 188/299; 188/322.15; 188/322.22; 188/319
[58] Field of Search ............... 188/319, 299, 322.22, 188/322.15, 322.13, 322.11, 285, 279, 281, 282, 316–318, 320; 267/127, 64.15; 137/599, 599.1; 280/668, 714

[56] References Cited

U.S. PATENT DOCUMENTS

| | | | |
|---|---|---|---|
| 967,285 | 8/1910 | Wilson | 188/319 |
| 2,950,785 | 8/1960 | Patriquin | 188/319 |
| 3,420,341 | 1/1969 | Keehn | 188/319 |
| 3,528,531 | 9/1970 | Schweller et al. | 188/319 |
| 3,559,776 | 2/1971 | Schultze | 188/319 |
| 3,724,615 | 4/1973 | Stormer | 188/322.22 X |
| 3,827,538 | 8/1974 | Morgan | 188/319 |
| 4,337,850 | 7/1982 | Shimokura | 188/319 |
| 4,463,839 | 8/1984 | Ashiba | 188/319 X |
| 4,527,676 | 7/1985 | Emura et al. | 188/319 X |
| 4,535,827 | 8/1985 | Shimokura | 188/319 |
| 4,606,440 | 8/1986 | Buchanan, Jr. et al. | 188/319 |
| 4,620,619 | 11/1986 | Emura et al. | 188/319 |
| 4,620,620 | 11/1986 | Johnston et al. | 188/319 |

Primary Examiner—Douglas C. Butler
Attorney, Agent, or Firm—Charles R. White

[57] ABSTRACT

Rebound and compression damping action of this hydraulic damper is set by rotating a selector plate within the damper piston to a number of positions to control orifice selection in parallel to flow through the disk plate pack and thereby control the rate of oil flow through the piston during rebound.

6 Claims, 4 Drawing Figures

HYDRAULIC DAMPER FOR VEHICLES WITH VARIABLE ORIFICE PISTON VALVING FOR VARYING DAMPING FORCE

This is a continuation of application Ser. No. 685,806, filed Dec. 24, 1984, now abandoned.

This invention relates to hydraulic dampers with selectively variable damping force or resistance for controlling suspension spring action and ride motions of vehicles and more particularly to a new and improved damper having selectively registrable orifice valving in the piston thereof for varying damping characteristics.

Prior to the present invention, various hydraulic dampers, i.e. shock absorbers and struts have been engineered with selectively variable orificing to control oil flow through the piston as it strokes in the cylinder tube to thereby control the action of the associated vehicle suspension springs. Generally such dampers involve costly and relatively complex blow off valving and controls and are not suitable for quantity production. In contrast to such prior dampers, the present invention provides new and improved variable valving and control system which involves minimum change to widely used piston valving and thereby eliminates the complexities and costs of extensive engineering and design work to produce an effective variable damper unit with improved and precisioned control of fluid flow through the shock absorber piston of the damper.

More particularly this invention provides a new and improved piston assembly for a hydraulic damper incorporating a rotatable selector plate operatively mounted on a centralized rivet or connector of a flexible disk pack of an orifice plate assembly. The orifice plate assembly includes a main body or piston plate with rebound and compression flow passages therethrough primarily controlled by upper and lower deflectable disk packs. The selector plate is turned in response to controls to various rotated positions to register and select orifices sized to further control the flow through the piston and thereby the resistance to stroking action within the cylinder tube. The selector plate is piloted on the cylindrical head of a centralized disk pack attachment rivit that has a plurality of arcuately spaced and varying sized radial flow control orifices therein. These orifices connect into a center passage in the rivit and cooperate therewith to form a selection of variable capacity flow passages which hydraulically are in parallel with the primary flow passages in the piston plate controlled by the deflected disk packs. With such selected capacity bypass orifice construction, hydraulic damping characteristics can be varied and selected for controlling piston velocity and suspension spring damping during rebound as well as during compression stroke. With control through the deflectable disk pack and the restricted bypass orifices hydraulic damping characteristics are varied and selected for controlling piston velocity and suspension spring damping particularly during rebound and also during compression.

In a preferred embodiment of this invention, selector plate rotation is controlled through a rotatable shaft extending in a hollow piston rod from an internal or external actuator. If desired, the selector plate can be rotated to a position in which the variable orificing has minimized flow capacity. With this orifice selection, the flow restriction through the piston is high and resistance to piston movement is high in the rebound and compression modes of operation. However, since compression loads are lighter, the selection does not provide the same degree of control and further detailed discussion particularly concerns the variation offered in controlling rebound. In any event with high flow restriction, piston velocities are reduced to provide for a stiff or hard ride that may be desired under certain vehicle operating conditions such as high speed cornering. When rotated to a second or intermediate position, the orifice size is increased for medium or intermediate rebound damping action and flow through the piston is increased. Under such intermediate condition, the resistance of the fluid within the damper to piston stroking in rebound is reduced. With reduced resistance, piston velocity is increased and the ride is resultantly softer.

In a third position or setting, the orifice size is large and optimized for a soft ride so that spring damping characteristics of the shock absorber are reduced. If even softer rides are desired, the number, location and size of the orifices can be engineered to provide for additional flow through the piston. With these selected orifice settings, the damper converts rebound motions into heat at selected rates so that road bumps are cushioned as desired by the vehicle operator. The variable orifice can be entirely closed if desired, so that piston velocities are in effect entirely controlled by the deflected disk pack for the hardest ride obtainable with this invention.

These and other features, objects and advantages of this invention will be more apparent from the following detailed description and drawing in which.

Figure 1:
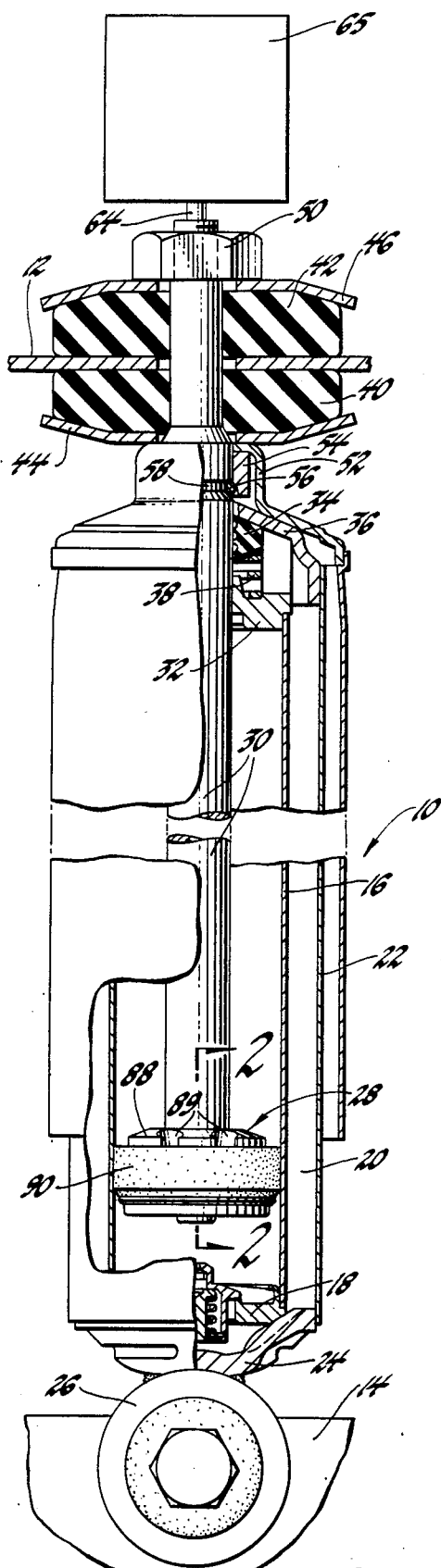
FIG. 1 is an elevational view partially in cross-section of a hydraulic damper according to this invention.

Turning now in greater detail to the drawings, there is shown in FIG. 1 a hydraulic, double-acting damper 10 operatively mounted between sprung and unsprung components of the vehicle here represented by an upper support plate 12 connected to the vehicle bodywork and a lower control arm 14 which is mounted to a steering knuckle and road wheel assembly. The damper 10 incorporates an elongated cylinder tube 16 having a conventional base valve 18 secured in the lower end thereof which controls the passage of oil between the cylinder tube and a surrounding oil reservoir 20 formed between the cylinder tube and a reservoir tube 22. The reservoir tube 22 is closed at its lower end by a base cup 24 on which the base valve 18 is seated. A lower mount 26 welded to the exterior of the base cup provides conventional connection to the control arm 14.

A valved piston assembly 28 and connected piston rod 30 are operatively mounted for linear stroking movement in the cylinder tube during shock absorber operation. Piston rod 30 extends upwardly from the piston assembly 28 through a conventional rod guide 32 mounted in the upper end of the cylinder tube. The piston rod further extends through an annular elastomeric seal 34 and through a cup-like seal cover 36 whose peripheral flange fits into and is welded to the upper end of the reservoir tube 22. A helical spring 38 seated on the rod guide and around the piston rod yieldably holds the seal against the inner surface of the seal cover 36. The upper end of piston rod 30 extends through a pair of elastomeric mounting disks 40, 42 and the surrounding backing plates 44, 46 disposed on opposite sides thereof to sandwich the support plate therebetween with a nut 50 threadedly received on the end of the piston rod seals against disk 46 and holds the elastomeric disks in compression.

A cup-like upper cover plate 52 through which piston rod 30 extends is connected to the piston rod immediately below backing plate 44 by a cylindrical retainer 54 and a cooperating snap ring 56 received in a groove 58 in rod 30. The elastomer mounting disks 40, 42 being effectively trapped between the upper and lower plates 46, 44 isolate the piston rod from the vehicle body as shown in FIG. 1. The piston rod 30 has a central bore 62 for receiving an elongated actuator rod or shaft 64 that extends therethrough.

The actuator rod, driven by suitable motor 65 which may be external as shown or internal as described in U.S. Pat. No. 4,620,620, issued Nov. 4, 1986 and assigned to the assignee of this invention and hereby incorporated by reference, is operatively connected to valving in the piston assembly described below. As shown, a lower end portion of this rod is rotatably mounted in a cylindrical bearing 66 which is press-fitted within a small diameter counterbore 68 in the lower end of piston rod 30. O-ring seals 70 fitted on the actuator rod 64 below bearing 66 contact the walls of the counterbore to block the passage of shock absorber oil through the central bore 62 to the exterior of the damper The actuator rod is retained in the central bore 62 of the piston rod by washers 74 seated against end wall 76 of a larger diameter counterbore 80 formed in the piston rod 30 and by a stop ring 82 fitted into a transverse annular groove 84 in the actuator rod 64 at the bottom side of washer 74. With such construction, the rod 64 cannot inadvertently be withdrawn from the piston rod 30.

Figure 2:
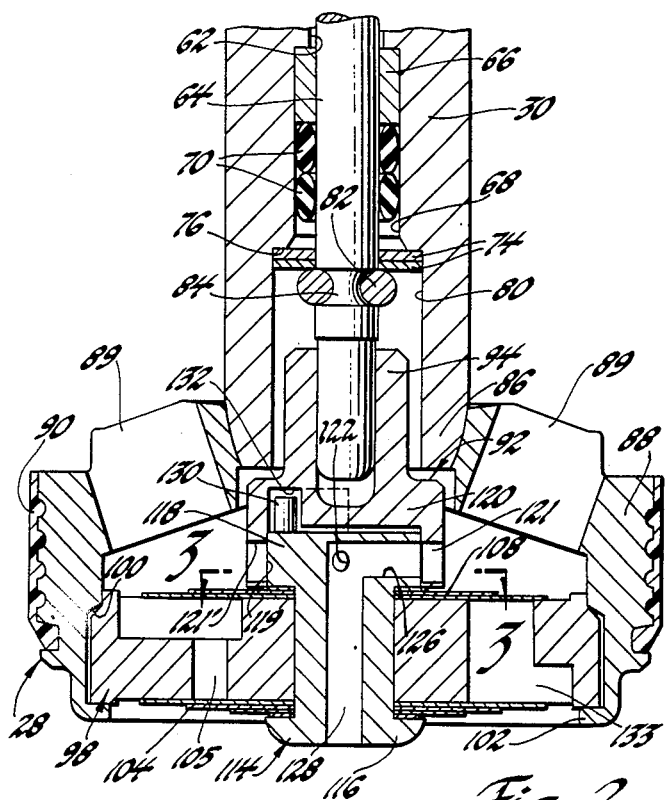
FIG. 2 is a cross-sectional view taken generally along sight lines 2—2 of FIG. 1 to show the valving of the piston assembly of this invention.

The inner end 86 of piston rod 30 is welded or otherwise fastened to a cylindrical shell-like main body 88 of the piston assembly 28. This main body has upper flow passages 89 therein and is peripherally bounded by a skirt 90 of Teflon or other suitable plastics material providing low friction sliding engagement with the inner wall of the cylinder tube 16. Mounted for axial rotational movement within the confines of main body 88 of the piston assembly 28 is a rotatable orifice selector plate 92 having an upstanding neck 94 keyed or otherwise connected to the end of rod 64 and received in the end of a large diameter counterbore 80 in the lower end of piston rod 30. In addition to the rotatable orifice selector plate 92, the main body 88 of piston assembly 28 houses an orifice plate assembly comprising a cylindrical, relatively thick, fixed orifice plate 98. The orifice plate is peripherally secured in the main body 88 of the piston between an inner locator shoulder 100 and an inwardly coined lower annular end 102. A lower valve spring disk pack 104 comprised of a series of flat washer-like valve disks of spring steel having decreasing diameter, top to bottom, is mounted adjacent to the bottom of the orifice plate to deflect downwardly in response to the forces of jets of hydraulic fluid thereon through passage 89 and 105 in rebound stroke to thereby control fluid flow through the orifice plate and upper valve spring disk pack 108 comprised of a series of flat washer like valve discs is mounted adjacent to the top of the orifice plate in response to the force of jets of hydraulic fluid on compression to provide control of fluid flow through the orifice plate on the compression stroke as is known by those skilled in this art. The spring disk packs 104 and 108 are held in operative position by a centralized rivet 114 having a lower coined end 116 and a cylindrical upper head 118 shown in FIG. 2.

The selector plate 92 has a cylindrical shoulder portion 120 with inner cylindrical wall 119 piloted on and rotatably mounted on the upper head 118 of the rivet and within the cavity of the main body 88 of the piston by rotation of rod 64 through the motor 65.

The selector plate 92 has a radial selector openings 121 and 121' therethrough which can be rotated into registry with first, second and third arcuately spaced passages 122, 124 and 126 extending radially from centralized passage 128 for controlling the flow of shock absorber fluid through the rivet 114. The first passage 122 has the smallest diameter and capacity while the second and third openings 124 and 126 are respectively progressively larger in diameter and fluid handling capacity. Selector plate rotation is controlled and limited by upstanding pin 130 on rivet head 118 which rides in arcuate slot 132 in shoulder portion of the selector plate. The contact of the pin 130 with the opposite ends of slot 132 determines register of radial passages 122 or 124 with selector opening 121 or 121'. The registry of orifice 126 with opening 121 can be by conventional internal stop or by using or stepping type motor.

Figure 3:
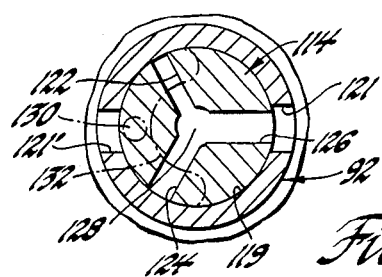
FIG. 3 is a cross-sectional view taken along sight lines 3—3 of FIG. 2 to show the selector plate and orifice plate relatively rotated to one of a plurality of operating positions for controlling fluid flow through the piston assembly during rebound.
Figure 4:
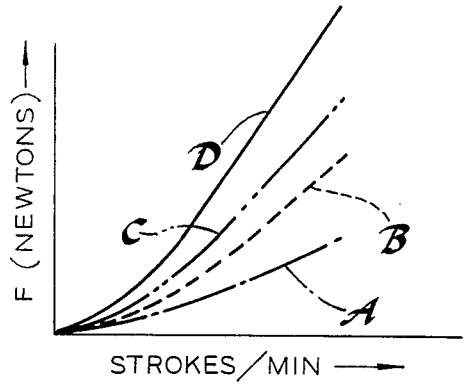
FIG. 4 is a graph illustrating operation of the invention.

By rotating the selector plate to selected positions by a suitable control of motor 65, various combinations of flow control orifices can be chosen to set the rebound damping characteristics of the shock absorber to meet the operator's requirements and demands. For example, if the selector plate is rotated to the FIG. 3 position in which selector plate opening 121 uncovers the radial passage 126 in the orifice plate, rebound damper oil flowing through the upper passages 89 can flow through opening 121, radial passage 126, axial passage 128 and in parallel to the flow through the orifice plate 98 to effect the damping force A curve illustrated in FIG. 4. With this selection the hydraulic damper has lowest damping force for boulevard type ride. In the event that the operator desires an intermediate ride, the selector plate 92 is rotated counterclockwise from the FIG. 3 position until the selector opening 121' is aligned with passage 124. In this condition, the suspension spring checking capability of the shock absorber is increased and piston velocity on rebound stroke is increased as shown by curve B. The vehicle ride is accordingly at an intermediate condition.

If a hard ride is desired the selector plate 92 may be selectively rotated so that opening 121' is in registry with opening 122. During rebound, flow through the passage in parallel with the passage through the orifice plate 98 is restricted to its maximum degree. Under such conditions, valve restriction is highest and resistance to piston movement is further increased. With this action, the suspension spring rate is in effect, increased as illustrated by curve C so that the ride is harder to provide sports car handling.

On compression with the piston assembly moving downwardly, the fluid in the cylinder tube below the piston 28 will flow through the passage 133 and deflected spring disk pack 108 as well as the selected restricted passage to vary damping forces. However, since the compression loads are lighter, the curve spread and damping selection is reduced.

While this invention shows three different selected flow control passages, additional passages can be provided so that flow rates through the piston on rebound can be further varied for further tailoring of shock absorber action. If desired all auxiliary passages can be blocked to provide the high degree of suspension spring checking and stiffest ride as illustrated by curve D.

The embodiments of the invention in which an exclusive property or privilege is claimed are defined as follows:

1. A hydraulic damping unit for controlling the spring action of vehicle suspension springs comprising a cylinder tube having a hydraulic fluid therein, a valved piston having a generally cylindrical body mounted for linear stroking movement in said cylinder tube and hydraulically separating said cylinder tube into first and second chambers, valve means within said body of said piston for controlling the flow of hydraulic fluid between said chambers through said piston, a piston rod connected directly to said body of said piston and extending to the exterior of said damping unit, a rotatable actuator operatively mounted in said piston rod, said valve means comprising an orifice plate fixed within said body of said piston having a plurality of hydraulic fluid flow controlling orifices therethrough, first and second deflectable spring disk means mounted on opposite sides of said orifice plate operatively associated with said orifices providing primary control of the damping force of said unit, fastener means extending through said orifice plate and said first and second disk means within the body of said piston, a plurality of separate and varying size fluid flow passages extended through said fastener means in parallel with said orifices, said fastener means having a head portion within said body of said piston, a selector plate rotatably mounted on said head portion and having a selector opening therein selectively registrable with any of said passages, means operatively connecting said selector plate to said actuator for rotation thereby so that any of said fluid flow passages can be selected for varying the damping action of said unit.

2. A deflected disk hydraulic damping unit for controlling the spring action of vehicle suspension springs comprising a cylinder tube having a hydraulic fluid therein, a valved piston having a shell-like and generally cylindrical body mounted for linear stroking movement in said cylinder tube and hydraulically separating said cylinder tube into first and second chambers, valve means housed in said body of said piston for controlling the flow of hydraulic fluid between said chambers through said piston, a piston rod connected to an upper portion of said main body of said piston and extending therefrom to the exterior of said damping unit, a rotatable actuator operatively mounted within said piston rod, said valve means comprising an orifice plate having fluid flow orifice means extending therethrough, retention means rigidly securing said orifice plate in said piston, selector plate means housed in said body of said piston and operatively connected to said actuator for rotation thereby, a plurality of deflectable valve spring disks operatively associated with said orifice means for controlling the flow of fluid therethrough, a central connector connecting said disks to opposite sides of said orifice plate, said connector having a head on the upper end thereof disposed entirely within said body of said piston, said selector plate means being mounted on said head of said connector and having a selector opening therein, said disks being deflectable in response to hydraulic fluid forces directed through said flow control orifice means to control the rate of flow of fluid through said piston and thereby the spring damping characteristics of said hydraulic damping unit, and a plurality of separate and variable capacity passage means in parallel with said orifice means extending directly through said head and said central connector and selected by said selector opening in response to the turning of said rotatable actuator and said selector plate means to predetermined positions relative to said head to selectively vary the damping characteristics of said unit.

3. A hydraulic damping unit for damping the spring action of vehicle suspension springs comprising a cylinder tube having a hydraulic fluid therein, a valved piston having a hollow main body mounted for linear stroking movement in said cylinder tube and hydraulically separating said cylinder tube into first and second variable volume chambers, valve means in said body of said piston for controlling the flow of hydraulic fluid between said chambers through said piston, a piston rod extending form connection with said piston to the exterior of said damping unit, a rotatable actuator rod extending within said piston rod, said valve means comprising an orifice plate assembly having an orifice plate fixed within the confines of said main body of said piston having a plurality of fluid flow passages therethrough, a rotatable selector plate connected to said actuator rod operatively mounted within said main body of said piston, a plurality of deflectable valve spring disks secured to said orifice plate and defelctable to thereby control the rate of flow of fluid through said flow passages in said orifice plate as said piston strokes in at least one direction and thereby the spring damping characteristics of said hydraulic damping unit, fastener means having an enlarged head portion within said body of said piston and having an elongated shank portion extending from said head portion to a lower end thereof operatively securing said valve disks to said orifice plate, axial passage means in said shank portion extending through a lower end thereof, a plurality of separate restricted passage means of differing flow capacities in said head portion of said fastener means operatively communicating with said axial passage means and bypassing said deflectable disks and selector plate means movably mounted on said head portion and having selector opening means therein to selectively register with any one of said restricted passage means in said head portion to set the damping characteristecs of said damping unit.

4. A shock absorbing unit for damping the ride motions of a vehicle in rebound and compression and operatively connected between sprung and unsprung vehicle masses comprising a cylinder tube filled with hydraulic fluid having a piston mounted for reciprocating movement therein, first closure means comprising a piston rod guide and seal assembly closing one end of said cylinder tube, second closure means closing the other end of said cylinder tube, a piston rod extending from securement with said piston through said cylinder tube and said piston rod guide for operative connection with said one of said vehicle masses, means securing said cylinder tube to the other of said vehicle masses, the improvement comprising an orifice plate fixed within the confines said piston, flow passage means through said orifice plate, deflectable disk pack means controlling the flow of said hydraulic fluid through said passage means, a centralized connector having a head portion housed within the confines of said piston for connecting the center of said disk pack directly to said orifice plate, a plurality of separate flow control orifice means through said centralized connector and extending radially outwardly therefrom, a selector plate operatively mounted within the confines of said piston and on said connector having a control opening therethrough selectively movable to a first position to register with a first of said orifices to establish in conjunction with said disk pack a first flow rate through said piston, and movable to a second position to establish in conjunction with said disk pack a second flow rate through said piston to thereby vary the damping action of said shock absorbing unit.

5. The shock absorbing unit defined in claim 4 wherein said control opening on selector plate is a radial flow opening and said head portion is an annular part and said orifice means are a plurality of separate radial flow control passages in said head portion with differing flow capacities selectively communicatable with said radial flow opening in said selector plate to vary the damping characteristics of said unit.

6. The shock absorbing unit defined in claim 4, wherein said piston is a shell-like housing, and wherein said head portion is an annular member and said selector plate is piloted on said head portion, said flow control orifices being arcuately disposed radial passages in said head portion, and an actuator rod extending within said piston rod for rotating said selector plate and thereby said control opening into selected registry with any one of said radial passages in said head portion of said centralized connector to set the damping characteristics of said unit.

* * * * *